United States Patent [19]
Read

[11] Patent Number: 5,796,875
[45] Date of Patent: Aug. 18, 1998

[54] SELECTIVE DE-BLOCKING FILTER FOR DCT COMPRESSED IMAGES

[75] Inventor: Christopher Jensen Read, San Diego, Calif.

[73] Assignees: Sony Electronics, Inc., Park Ridge, N.J.; Sony Corporation, Tokyo, Japan

[21] Appl. No.: 696,323

[22] Filed: Aug. 13, 1996

[51] Int. Cl.[6] .............................. G06K 9/40; G06T 5/00
[52] U.S. Cl. ................................. 382/261; 382/268
[58] Field of Search ................................. 382/268, 261, 382/264, 260, 250; 348/420; 358/433

[56] References Cited

U.S. PATENT DOCUMENTS

| 4,805,129 | 2/1989 | David . |
| 4,910,594 | 3/1990 | Kondo . |
| 5,023,710 | 6/1991 | Kondo et al. . |
| 5,049,990 | 9/1991 | Kondo et al. . |
| 5,070,403 | 12/1991 | Wilkinson . |
| 5,142,537 | 8/1992 | Kutner et al. . |
| 5,272,536 | 12/1993 | Sudo et al. . |
| 5,335,019 | 8/1994 | Herz et al. . |
| 5,337,088 | 8/1994 | Honjo ........................ 348/420 |
| 5,351,083 | 9/1994 | Tsukagoshi . |
| 5,381,354 | 1/1995 | Soloff . |
| 5,590,064 | 12/1996 | Astle ........................ 382/268 |

FOREIGN PATENT DOCUMENTS

| 571171A2 | 5/1993 | European Pat. Off. . |
| 590922A2 | 9/1993 | European Pat. Off. . |
| 680217A2 | 4/1995 | European Pat. Off. . |
| 680219A2 | 5/1995 | European Pat. Off. . |
| 4128977A | 8/1994 | Netherlands . |
| 2287153 | 9/1995 | United Kingdom . |
| 9119271 | 12/1991 | WIPO . |

OTHER PUBLICATIONS

Avideh Zakhor, "Iterative Procedures for Reduction of Blocking Effects in Transform Image Coding", Jun. 10, 1991, pp. 91–95.

International Telecommunication Union, "Line Transmission of Non–Telephone Signals", Mar. 1993, pp. 1–25.
Patent Abstracts of Japan, Publication No. 05219493, Aug. 27, 1993, "Picture Information Restoring Device," 1 page.
Patent Abstracts of Japan, Publication No. 04342372, Nov. 27, 1992, "Image Data Compressor," 1 page.
Patent Abstracts of Japan, Publication No. 05110868, Apr. 30, 1993, "Visual Characteristic Region Conversion System," 1 page.
International Search Report Dated Jun. 10, 1997 for PCT Patent Application No. PCT/US 97/00499 filed Jan. 10, 1997.
International Search Report Dated Jun. 10, 1997 for PCT Patent Application No. PCT/US 97/00737 filed Jan. 10, 1997.
International Search Report Dated Jun. 30, 1997 for PCT Patent Application No. PCT/ US 97/03292 filed Mar. 3, 1997.
"An Adaptive Image Quality Improvement Method for DCT Coding Schemes," *PCS '93 1993 Picture Coding Symposium Proceedings*, Mar. 17–19, 193, Swiss Federal Institute of Technology, Lausanne –Switzerland, 3 pages.
Patent Abstracts of Japan, Publication No. 07087500, Mar. 31, 1995, "Method for Post–Processing for Decoded Picture Signal," 1 page.
Ken Sauer, "Enhancement of Low Bite–Rate Coded Images Using Edge Detection and Estimation," *Graphical Models and Image Processing*, Jan. 1991, vol. 53, No. 1, pp. 52–62.

*Primary Examiner*—Scott Rogers
*Attorney, Agent, or Firm*—Blakely, Sokoloff, Taylor & Zafman

[57] ABSTRACT

A method and apparatus to selectively post process decompressed image data to minimize blocking effects. Each pair of pixels across a block boundary is examined to determine whether the boundary pixels should be filtered. In one embodiment, if the difference between boundary pixels is less than a first predetermined threshold and the energy along the boundary is less than a second predetermined threshold, the boundary pixels are filtered to produce an output image having minimized blocking effects along block boundaries.

20 Claims, 3 Drawing Sheets

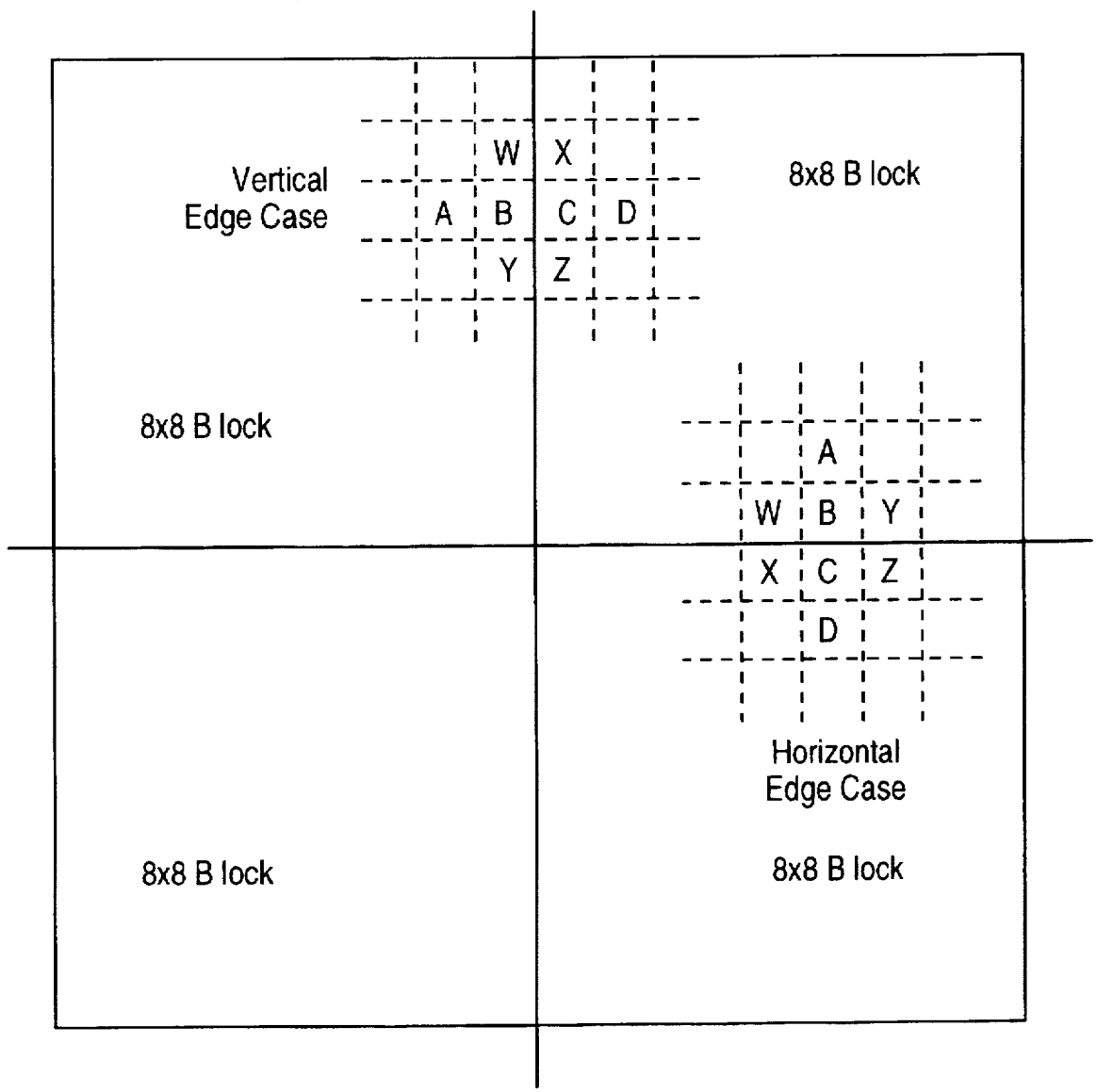

5,796,875

1

SELECTIVE DE-BLOCKING FILTER FOR DCT COMPRESSED IMAGES

BACKGROUND OF THE INVENTION

1. Field of the Invention

The present invention relates to the removal of blocking effects in images previously compressed and decompressed. More particularly, the present invention relates to the removal of blocking effects in images compressed in accordance with DCT based formats.

2. Art Background

The need to compress digital image data, whether static or dynamic (i.e., video images) images has dramatically increased. One reason is the dramatic popularity of multimedia computer systems and software. One application that typically utilizes video compression is video conferencing systems. For video conferencing applications, compression is used in order to minimize the bandwidth required to timely transmit video images between conferencing locations. Thus, the image data, for example, the image of a speaker at a first conference location, is transmitted in a compressed format to a second conference location. At the second conference location, the image data is decompressed prior to the display of the image. For video conferencing one compression algorithm used is set forth in the H.261 standard (International Telecommunication Union, Telecommunication Standardization Sector (ITU-T) Recommendation H.261, March 1993).

Many compression processes, including those that are used for video conferencing utilize transform coding. In a transform coding process, an image is divided into blocks. The transform of each block is taken, the coefficients of which are quantized in accordance with a determined quantization factor q. The most popular transform is the discrete cosine transform (DCT).

However, one negative effect of the process is referred to as the "blocking effect". By dividing the image into blocks prior to encoding, discontinuities (referred to as blocking effects) between adjacent blocks occurs through the encoding and decoding process. This is represented in a displayed decompressed image by clear jumps in color or greyscale levels between block edges as opposed to a smooth change.

Pre-processing and post-processing techniques are utilized to minimize blocking effects. Pre-processing techniques dictate that the originator of the image data must perform certain steps to minimize blocking effects. Post-processing techniques, although logistically better as the correction is performed after decompression, has its problems. For example, one of the simplest techniques is to process the decompressed image data through a low pass filter. Although the blocking effects are decreased, the sharpness of the displayed image is negatively affected.

SUMMARY OF THE INVENTION

The method and circuit of the present invention post processing is performed on decompressed image data to minimize blocking effects without affecting the sharpness of the image. To decompress the image, an inverse discrete cosine transform (IDCT) is performed on the data to place the image data in the spatial domain. The pixels along block boundaries, referred to herein as boundary pixels, are then examined to determined whether filtering should be applied to the boundary pixels. In one embodiment, pairs of adjacent boundary pixels, one from each block, are selectively filtered if the difference between boundary pixels across the boundary is less than a first predetermined threshold and the energy along the boundary is less than a second predetermined threshold. If the criteria is met for a pair of boundary pixels, the boundary pixels are filtered, preferably using a finite impulse response filter to minimize blocking effects on the blocking boundary.

BRIEF DESCRIPTION OF THE DRAWINGS

The objects, features and advantages of the present invention will be apparent to one skilled in the art in light of the following detailed description in which:

FIG. 3 is a diagram illustrating boundary pixels and adjacent pixels evaluated in accordance with the teachings of the present invention.

DETAILED DESCRIPTION

The present invention provides a simple but effective apparatus and method for minimizing blocking effects that occur in discrete cosine transform images. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily. The system and method is described in the context of a video conferencing system. However, the system and method is applicable to a variety of types of compressed images which utilize transform encoding in the compression process.

Figure 1A:
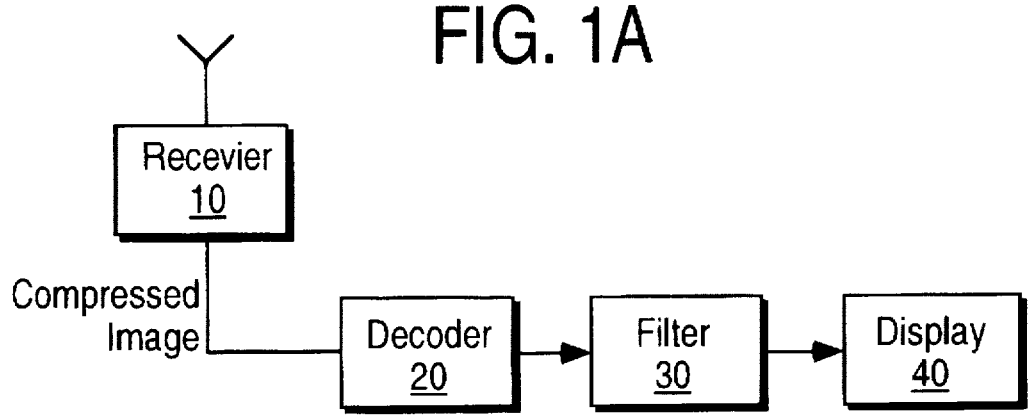
FIG. 1a is a simplified block diagram of a system that operates in accordance with the teachings of the present invention and FIG. 1b is a simplified block diagram of a video conference system that operates in accordance with the teachings of the present invention.

A simplified block diagram of an exemplary system that operates in accordance with the teachings of the present invention is illustrated in FIG. 1a. To minimize the bandwidth required to transmit an image during a video conference, the image is frequently formatted in a compressed form which utilizes discrete transforms. Popular examples of formats include those that comply with the H.261 videoconferencing standard. The system illustrated includes a receiver circuit 10, decoder circuit 20, filter circuit 30 and display 40. The receiver circuit 10 receives the compressed data transmitted. Typically, the compressed video image is received over telephone lines, although other types of transmission media are also contemplated. Furthermore, for purposes of explanation, the image data is received in a format compatible with the H.261 specification; however, the other types of compressed formats that use discrete transforms to compress the data can also be used.

Once the image data is received, the data is decoded (i.e., decompressed) by decoder circuit 20 and processed by filter circuit 30 in order to remove blocking effects created by the encoding and decoding processes. The modified image data subsequently displayed by display subsystem 40 shows an image in which the blocking effects are minimized.

Figure 1B:
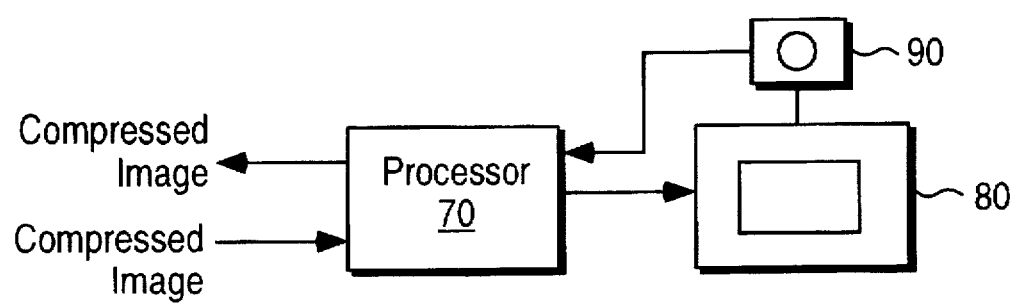

An alternate embodiment of the system is shown in FIG. 1b. FIG. 1b illustrates a video conferencing system which includes processing system 70, display 80 and camera 90. The processing system 70 receives the compressed image and decodes, filters and outputs the images for display on display device 80 in accordance with the teachings of the present invention. The processing system 70 also receives video input from camera 90 for encoding and output to other video conferencing locations. It is contemplated that other images, such as images of documents can similarly be processed to provide a full feature video conference system. Furthermore, it is apparent that the circuitry or processing system can be implemented a variety of ways to achieve the processing function. For example, the process can be implemented in special purpose hardware or a dedicated computer system executing software to perform the steps described below.

Figure 2:
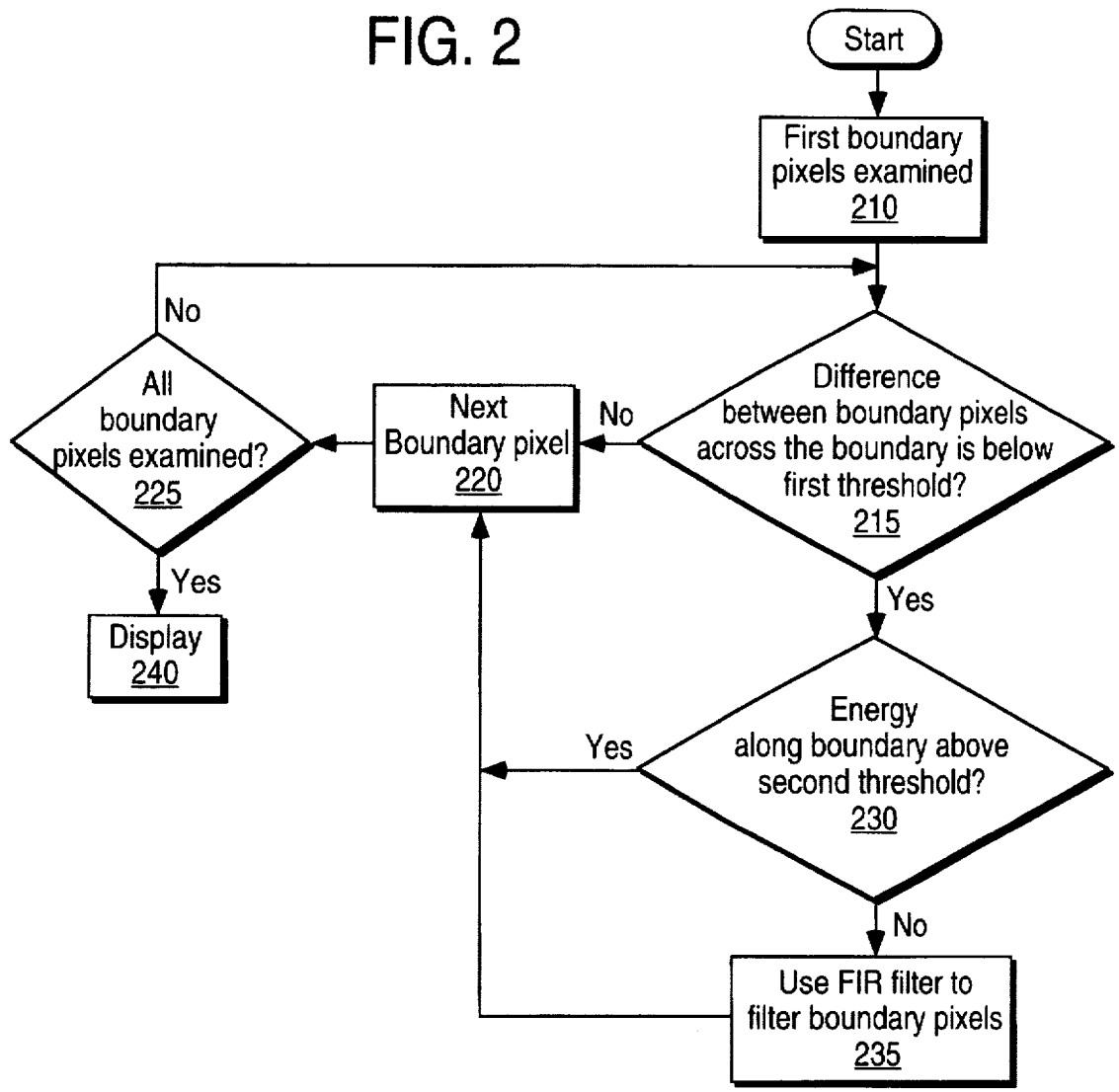
FIG. 2 is a flow chart depicting the process for minimizing blocking effects.

FIG. 2 sets forth one embodiment of the method for minimizing blocking effects. At step 210, the first pair of boundary pixels is examined. Boundary pixels are defined herein as adjacent pixels, across block boundaries. See for example FIG. 3, in which pixels B and C are considered to be boundary pixels. At step 215, it is determined whether the difference between boundary pixels is below a first predetermined threshold indicative that filtering is acceptable. The threshold is chosen to be sufficiently high such that a real edge of the image itself that occurs along a block boundary will not likely be removed by the filtering success (i.e., the difference between boundary pixels along a true edge of the image is above the first predetermined threshold). It is contemplated that the threshold can be determined empirically. However, in the present example in which data is encoded and decoded in accordance with the H.261 standard, the threshold is selected typically to be a value in the range of 16 to 32.

If the difference between boundary pixels is above the first threshold, no filtering of those boundary pixels occur and the next pair of boundary pixels is retrieved for evaluation, step 220. Once all boundary pixels have been examined, step 225, the filtering process is complete and the resultant image is ready for display. If all pixels have not been examined, the process returns to step 215 for processing of the next pair of boundary pixels.

At step 215, if the difference between boundary pixels is less than the first threshold, it is next determined whether the energy along the boundary is above a second predetermined threshold, step 230. If the energy along the boundary is too high (i.e., above the second threshold), the filtering process will increase, rather than minimize the visual blocking effects; thus the filtering process is not performed for the boundary pixels, and the next pair of boundary pixels is retrieved for processing, steps 220, 225.

The amount of energy along the boundary is determined by measuring the change in pixel values along the boundary. In the present embodiment, the amount of energy along the boundary is determined by taking the sum of the absolute differences between the boundary pixel to be filtered and the two adjacent pixels on the same edge of the boundary. For example, referring to FIG. 3, the boundary pixels that may be filtered are pixels B and C. Continuing with the present example, the energy along the boundary is determined to be above the threshold if:

$$|W-B|+|Y-B|>|B-C| \text{ or } |X-C|+|C-Z|>|B-C|.$$

Referring back to FIG. 2, if the boundary pixels meet the criteria set forth at steps 215, 230, the boundary pixels are adjusted or filtered to minimize blocking effects, step 235. In the present embodiment, only the boundary pixels are adjusted (e.g., B and C, FIG. 3); however, it is readily apparent that the filter function, or apparent modification of the same, can be applied to the boundary pixels and adjacent pixels.

The filter function should be chosen to minimize the variance between the filtered pixel and the same pixel in the corresponding original uncompressed image. Preferably a finite impulse filter (FIR) is used. In the present embodiment, the following filter function is used:

$$B_{adj}=pA+qB+rC+sD$$

$$C_{adj}=sA+rB+qC+pD$$

where $B_{adj}$ and $C_{adj}$ represent the adjusted boundary pixels; A, D represent the pixels adjacent to the boundary pixels B, C (see FIG. 3); and p, q, r and s represent the filter coefficients.

The filter coefficients can be chosen in a variety of ways known to one skilled in the art. Preferably, the number of filter coefficients used is four. However, the number of coefficients can be modified to be more or less depending upon the cost of adding coefficients and the incremental benefit gained at the output. In the present embodiment, the four filter coefficients are chosen by deriving a Wiener filter using known sample data where the desired output of the filter is the value of the same pixel in the original (uncompressed) image, and the input values for auto correlation and cross-correlation functions are the four decompressed pixel values that would be input to the filter when the thresholds have been met. To achieve optimal results, it is preferred that the sample data used is reflective of the anticipated images to be processed.

The implementation of Wiener filters is well known in the art, and will not be discussed in detail herein (for further information on FIR filters and Wiener filters, see Jain, *Fundamentals of Digital Image Processing*, (Prentice-Hall Inc. 1989), pp. 275–290). However, preferably the filter coefficients are determined according to the following:

$$[pqrs]^T=R^{-1}P$$

Where | |$^T$ a transposed function, $$R=E\begin{bmatrix} A^2 & AB & AC & AD \\ AB & B^2 & BC & BD \\ AC & BC & C^2 & CD \\ AD & BC & CD & D^2 \end{bmatrix}$$

R is the auto correlation matrix of the 4 decompressed input samples:

where E represents the expected value statistical function and the values within the matrix are the corresponding pixel values of one decoded sample image data;

and P is the cross correlation matrix between 4 decompressed pixel values and the corresponding pixel value of the original (uncompressed) image:

$$P=E[dA \; dB \; dC \; dD]$$

where d represents the pixel in the original image corresponding to decompressed pixel B.

Referring back to step 235, FIG. 2, and continuing with the present example, the filter function is implemented to adjust the pixel values:

$$B_{adj}=qA+qB+rC+sD$$

$$C_{adj}=sA+rB+qC+pD$$

Once all the boundary pixels are evaluated and adjusted by filtering (if necessary), the image is output for display, step 240. As the process for selectively adjusting the pixels to minimize blocking effects only affects the boundary pixels and is simple to perform, such computations can be performed in a timely manner in order to maintain the real time response needed to effect a functional video conference.

The invention has been described in conjunction with the preferred embodiment. It is evident that numerous alternatives, modifications, variations and uses will be apparent to those skilled in the art in light of the foregoing description.

What is claimed is:

1. A method for minimizing blocking effects in an image described by image data, said method comprising the steps of:

for each pair of boundary pixels across a block boundary,
determining if a difference between boundary pixels is less than a first predetermined threshold,
determining if the energy along the boundary is greater than a second predetermined threshold,
if the difference between boundary pixels is less than the first predetermined threshold and energy along the boundary is less than a second predetermined threshold, filtering the boundary pixels to minimize blocking effects to generate an adjusted image, said filtering configured to minimize the variance between a filtered pixel and the same pixel in a corresponding original.

2. The method as set forth in claim 1, further comprising the step of filtering pixels adjacent to the boundary pixels if the boundary pixels are filtered.

3. The method as set forth in claim 1, wherein the first predetermined threshold is selected to be sufficiently high such that a real edge of the image that occurs along a block boundary is not removed by filtering.

4. The method as set forth in claim 1, wherein the first predetermined threshold is a value in the range of 16 to 32.

5. The method as set forth in claim 1, wherein the second predetermined threshold is selected to be sufficiently high to be indicative that filtering of the boundary pixels increases the blocking effects along the block boundary.

6. The method as set forth in claim 1, wherein the energy is measured as the sum of the absolute differences between the boundary pixels and adjacent pixels along a same edge of the boundary and the second predetermined threshold is set to be the absolute difference between boundary pixels.

7. The method as set forth in claim 1, wherein the step of filtering the boundary pixels is performed using a finite impulse response filter.

8. The method as set forth in claim 7, wherein four filter coefficients are used.

9. The method as set forth in claim 1, wherein the step of filtering the boundary pixels B, C comprises the following steps:

adjusting boundary pixel B to be equal to pA+qB+rC+sD, where p, q, r, and s are filter coefficients, A is a pixel adjacent to pixel B and D is a pixel adjacent to boundary pixel C; and
adjusting boundary pixel C to be equal to sA+rB+qC+pD.

10. A system comprising:

a first logic coupled to receive as input pixel data of an image, said first logic determining if a difference between boundary pixels across a block boundary is greater than a first predetermined threshold and if energy along the block boundary is greater than a second predetermined threshold; and a filter device coupled to the first logic configured to minimize the variance between a filtered pixel and the same pixel in a corresponding original, said filter device filtering the boundary pixels to minimize blocking effects if the difference between boundary pixels across the block boundary is less than the first predetermined threshold and the energy along the block boundary is less than the second predetermined threshold, said filter device outputting an adjusted image having minimized block effects along block boundaries.

11. The system as set forth in claim 10, further comprising:

an input device for receiving compressed image data;
a decoder coupled to the input device for decoding the compressed image data to provide decompressed image data provided to the first logic as the input pixel data; and
a display device coupled to the filter device for displaying the adjusted image.

12. The system as set forth in claim 10, wherein the first predetermined threshold is selected to be sufficiently high such that a real edge of the image that occurs along a block boundary is not removed by filtering.

13. The system as set forth in claim 10, wherein the first predetermined threshold is a value in the range of 16 to 32.

14. The system as set forth in claim 10, wherein the second predetermined threshold is selected to be sufficiently high to be indicative that filtering of the boundary pixels increases the blocking effects along the block boundary.

15. The system as set forth in claim 10, wherein the energy is measured as the sum of absolute differences between the boundary pixels and adjacent pixels on a same edge of the boundary and the second predetermined threshold is set to be the absolute difference between boundary pixels.

16. The system as set forth in claim 10, wherein the step of filtering the boundary pixels is performed using a finite impulse response filter.

17. The system as set forth in claim 10, wherein the filter device adjusts boundary pixel B to be equal to pA+qB+rC+sD, where p, q, r, and s are filter coefficients, A is a pixel adjacent to pixel B and D is a pixel adjacent to boundary pixel C, and adjusts boundary pixel C to be equal to sA+rB+qC+pD.

18. A computer system comprising:

an input device for receiving image data;
a processor coupled to the input device configured to selectively filter boundary pixels along block boundaries, said processor determining if a difference between boundary pixels across a block boundary is less than a first predetermined threshold and if energy along the block boundary is less than a second predetermined threshold, filtering the boundary pixels to minimize blocking effects if the difference between boundary pixels across the block boundary is greater than the first predetermined threshold and the energy along the block boundary is greater than the second predetermined threshold and outputting an adjusted image having minimized block effects along block boundaries; and a display device coupled to the processor for displaying the adjusted image.

19. The computer system as set forth in claim 18, wherein the computer system is a video teleconferencing system, and said input device receives compressed image data, said processor further decoding the compressed image data to generate decompressed image data, said boundary pixels of the decompressed image data filtered if the difference between boundary pixels across the block boundary is less than the first predetermined threshold and the energy along the block boundary is less than the second predetermined threshold.

20. The computer system as set forth in claim 18, wherein the processor adjusts boundary pixel B to be equal to pA+qB+rC+sD, where p, q, r, and s are filter coefficients, A is a pixel adjacent to pixel B and D is a pixel adjacent to boundary pixel C, and adjusts boundary pixel C to be equal to sA+rB+qC+pD.

* * * * *